United States Patent [19]

Brandt

[11] Patent Number: 4,691,935
[45] Date of Patent: Sep. 8, 1987

[54] ANTI-THEFT TRAILER ASSEMBLY AND TRAILER HITCH LOCK

[76] Inventor: Louis Brandt, 44643 Fern Ave., Lancaster, Calif. 93534

[21] Appl. No.: 892,296

[22] Filed: Aug. 4, 1986

[51] Int. Cl.⁴ .............................................. B60R 25/00
[52] U.S. Cl. ...................................... 280/507; 70/231; 70/258
[58] Field of Search .................. 280/507; 70/231, 232, 70/258

[56] References Cited

U.S. PATENT DOCUMENTS

| | | | |
|---|---|---|---|
| 2,656,706 | 10/1953 | Lucas et al. | 280/507 X |
| 2,983,133 | 5/1961 | Hruby | 70/232 X |
| 3,004,421 | 10/1961 | Bowler | 70/232 |
| 3,269,159 | 8/1966 | Young | 280/507 X |

FOREIGN PATENT DOCUMENTS

| | | | |
|---|---|---|---|
| 325765 | 6/1919 | Fed. Rep. of Germany | 70/232 |
| 628058 | 8/1949 | United Kingdom | 70/232 |

*Primary Examiner*—John A. Pekar
*Attorney, Agent, or Firm*—John J. Posta, Jr.

[57] ABSTRACT

The anti-theft trailer assembly includes a trailer body, a cab connector in the form of a hitch post depending from the front portion of the trailer and having a generally central annular recess therein, and a lock releasably secured in the annular recess. The lock has a lock body with two generally U-shaped halves, each with a pair of spaced arms, one set having depending posts releasably secured in the other set of arms. The lock halves define a central transverse opening which receives the recessed portion of the hitch post, rendering it unusuable by filling it and slightly bulging from it. The lock cannot be pried out from the recess. The locking mechanism includes a locking plate, the ends of which fit into opposed notches of the lock posts, and a key lock component fixedly secured to the plate and rotatable by a key to move the plate out of the notches to unlock the halves against the biasing force of a spring bearing against the plate. The lock is simple, durable and efficient.

2 Claims, 7 Drawing Figures

ANTI-THEFT TRAILER ASSEMBLY AND TRAILER HITCH LOCK

BACKGROUND OF THE INVENTION

1. Field of the Invention

The present invention generally relates to anti-theft devices and, more particularly, to an improved trailer hitch lock and trailer assembly bearing the same.

2. Prior Art

When a vehicle trailer is unhitched from its pull cab, various types of locks can be used to prevent the re-hitching of the trailer to another cab for theft of the trailer. For those trailers and cabs employing ball and socket hitching devices, locks have been devised to fit over or within the socket (see U.S. Pat. Nos. 4,571,964; 3,492,023; 3,810,664; and 3,884,005) or over the ball (see U.S. Pat. No. 4,032,171). All of such locking mechanisms are relatively easy to pry off of or out of the protected ball or socket component. For those trailers which use hitches in the form of front vertically depending posts containing annular recesses and posts, which posts fit into rear vertical contoured cab bed openings, locks such as that shown in U.S. Pat. No. 2,641,124 have been devised. Such a lock encloses the hitch post and thus is also easy to pry off in order to expose the post for use.

Accordingly, there is a need for an improved type of durable, inexpensive and effective trailer hitch post lock which resists prying off and easily and efficiently renders the post temporarily unusuable for hitching. Preferably, such lock should also have an automatic locking mechanism which operates when the lock is placed into position and closed.

SUMMARY OF THE INVENTION

The improved trailer hitch post lock of the present invention and the improved trailer assembly bearing the same satisfy all the foregoing needs. The lock and assembly are substantially as set forth in the Abstract. Thus, the assembly includes a trailer body, a cab connector hitch in the form of post depending from the front of the trailer and having an annular recess between the ends thereof, and a lock releasably secured in the recess, so as to prevent the use of the post in hitching the trailer to a cab in order to steal it, i.e., unauthorizedly haul it away.

The lock comprises two generally U-shaped halves with spaced sets of legs which releasably abut each other to define a central transverse opening in which the recessed portion of the hitching post is disposed. The lock is dimensioned so that it fills the annular recess and slightly bulges therefrom so that it disables the post but cannot be pried therefrom.

The lock has a locking mechanism which includes a spaced pair of posts in one half of the lock received in openings in the other lock half. The posts have facing notches in which the opposite ends of a transverse locking plate are disposed. The plate is fixed to a key lock section and rotates therewith to the unlocked position from a spring biased automatically locked position. The lock post ends are tapered to temporarily move the plate to the unlocked position against the spring biasing during insertion of the posts in the post openings.

Further features of the present invention are set forth in the following detailed description and accompanying drawings.

DRAWINGS

DETAILED DESCRIPTION

FIGS. 1–7.

Figure 1:
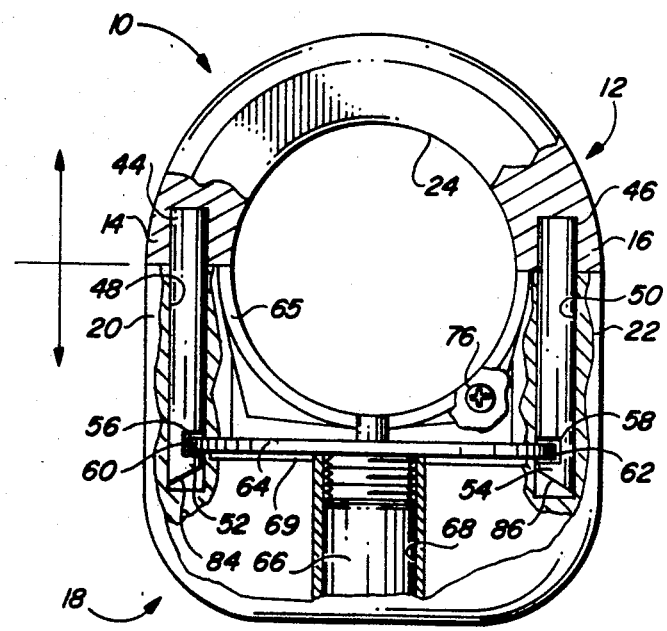
FIG. 1 is a schematic front elevation, partly broken away, of a preferred embodiment of the improved trailer hitch post lock of the present invention.
Figure 2:
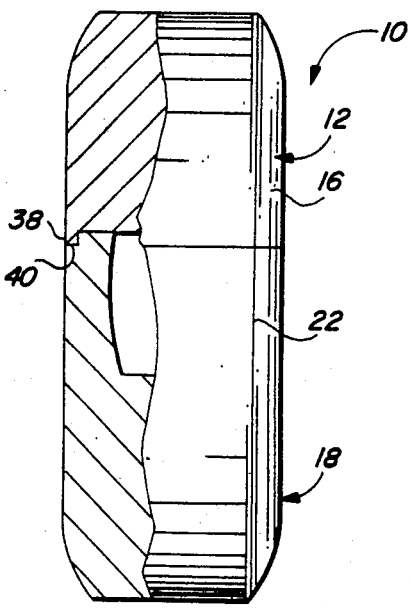
FIG. 2 is a schematic side elevation, partly broken away, of the lock of FIG. 1.
Figure 4:
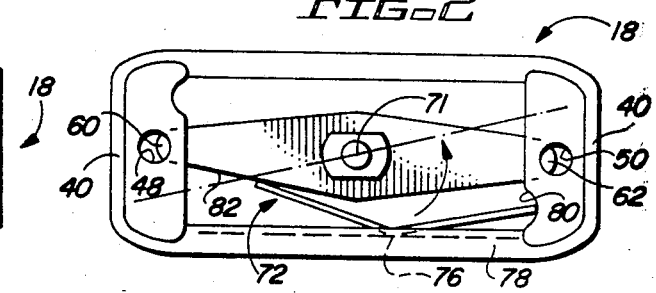
FIG. 4 is a schematic top plan view, partly broken away, of the lower half of the lock of FIG. 1.
Figure 5:
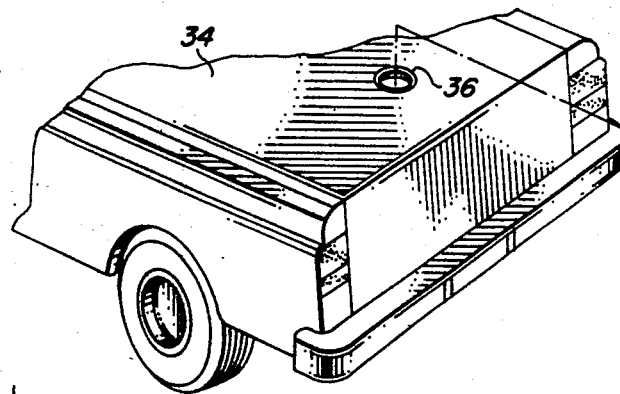
FIG. 5 is a schematic perspective view of the improved anti-theft trailer assembly of the present invention utilizing the lock of FIG. 1.
Figure 5:
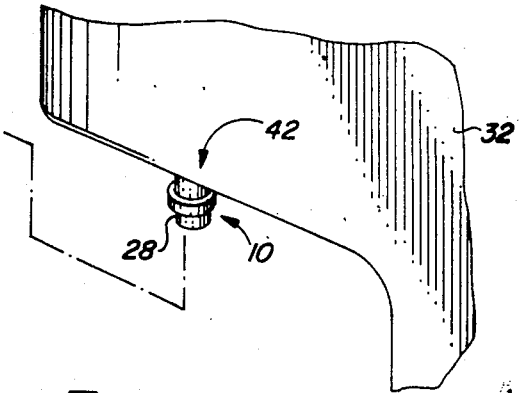
Figure 6:
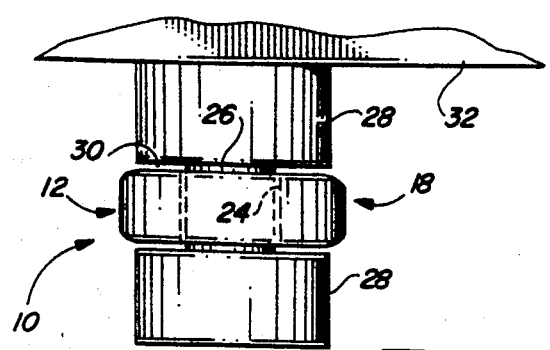
FIG. 6 is a schematic side elevation of the lock of FIG. 1 around the hitch post of the assembly of FIG. 5; and, FIG. 7 is a schematic bottom plan view of the upper half of the lock of FIG. 1.
Figure 7:
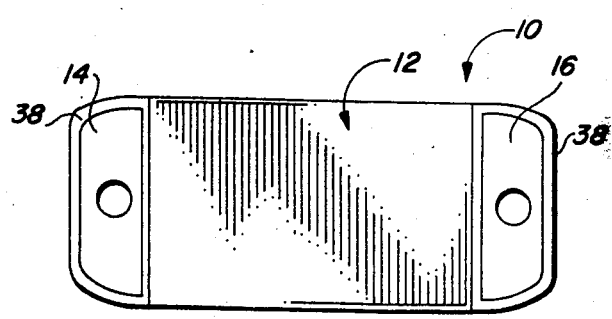

Now referring more particularly to the accompanying drawings, the improved trailer hitch lock and trailer assembly of the present invention are schematically depicted therein. Thus, lock 10 is shown. For the purposes of the following description, lock 10 will be described relative to its vertical position as shown in FIG. 1, although it is used in a horizontal position, as shown in FIGS. 5 and 6. Lock 10 comprises a generally inverted U-shaped upper half 12 with spaced depending legs 14 and 16, and a generally U-shaped lower half 18 with spaced upstanding legs 20 and 22 abutting legs 14 and 16, respectively, when in the locked position (FIG. 1) and defining therebetween a central cylindrical transverse opening 24 adapted to receive the narrow central portion 26 of depending trailer hitch post 28 (FIG. 6) defining a central annular recess 30. Preferably, lock 10 is dimensional so that when locked in recess 30, the inner margins of legs 14, 16, 20 and 22 defining opening 24 about touch and span the outer periphery of portion 26 so as to substantially fill recess 30 and bulge slightly therefrom (FIGS. 5 and 6), rendering post 28 unuseable for hitching trailer 32 (to the front bottom portion of which it is attached) to cab 34 by insertion of post 28 in vertical opening 36 in the top rear of cab 34. It will also be noted that lock 10 cannot be pried out of recess 30 because it about abuts the top and bottom margins of recess 30 and leaves no prying room and because half 12 of lock 10 bears narrow depending peripheral rims 38 (FIG. 7) mating with narrow peripheral recesses 40 (FIG. 4) in the upper end of lower half 18, thus preventing insertion of a prying instrument (not shown) to any substantial depth between rims 38 and recesses 40. Accordingly, once lock 10 is in place in recess 30 of hitch post 28 on trailer 32, the resulting assembly 42 has improved anti-theft properties.

The locking mechanism for lock 10 includes a pair of posts 44 and 46 (FIG. 1) secured in and depending vertically from legs 14 and 16, respectively, for insertion in openings 48 and 50, respectively, (FIG. 4) in legs 20 and 22, respectively. The lower ends 52 and 54 of posts 44 and 46, respectively, contain facing transverse notches 56 and 58, which receive the narrow opposite ends 60 and 62, respectively, of a transverse oval locking plate 64. Plate 64 is spaced below and covered by a curved plate 65 secured in place, as by one or more screws 67, plate 64 is supported above a horizontal plate 69.

Figure 3:
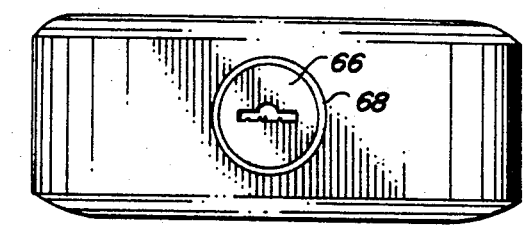
FIG. 3 is a schematic bottom plan view of the lock of FIG. 1.

Plate 64 is fixedly secured to the center of the upper end 71 of vertical key lock portion 66 which is disposed in channel 68 and extends to the lower end 70 of half 18 (FIG. 3). Portion 66 is rotatable by a key (not shown). This rotation effects corresponding rotation of plate 64 from the locked position of FIGS. 1 and 4 to an unlocked position in which ends 60 and 62 are out of notches 56 and 58 of posts 44 and 46 permitting posts 44 and 46 and upper half 12 to be separated from lower half 18 to open lock 10.

V- or L-shaped spring 72 (FIG. 4) is disposed on plate 69 in half 18 with mid-portion 74 thereof in a recess 76 in the side 78 of half 18, while one end thereof fits into a recess 80 in one end of half 18 and the other end thereof abuts a side 82 of plate 64, biasing it into the locked position. A detent (not shown) prevents rotation of plate 64 in the housing direction beyond the locked position shown in FIG. 4. The dotted line through plate 64 in FIG. 4 shows the longitudinal center line thereof when plate 64 is rotated by component 66 to the unlocked position.

Plate 64 is also rotated to the unlocked position when posts 44 and 46 are inserted down in openings 48 and 50 into contact with plate 64 during locking of halves 12 and 18 together. Thus, ends 52 and 54 of posts 44 and 46 bear tapered or sloped surfaces 84 and 86, respectively, which contact and force plate 64 to rotate to the unlocked position as posts 44 and 46 pass down in openings 48 and 50, until notches 56 and 58 are at the horizontal level of plate 64, whereupon plate ends 60 and 62 are biased into notches 56 and 58 by spring 72 to automatically lock halves 12 and 18 together.

Therefore, lock 10 is simple in construction, easy to lock and unlock, cannot be pried out of recess 30 and effectively prevents theft of unhitched trailer 32 by attachment to a thief's cab.

Lock 10 can be made inexpensively of durable components, such as steel or the like, in a variety of sizes and shapes to fit various trailer hitch post annular recesses. One such embodiment is of tool steel, with a central opening 24 about 2 inches in diameter an overall length of 4 inches, a width of 3 inches and a thickness of 1.5 inches. Key locking component 66 utilized in lock 10 can be of the simple tumbler type.

Various modifications, changes, alterations and additions in the improved trailer hitch post recess lock and trailer assembly of the present invention and in their components can be devised. All such modifications, changes, alterations and additions as are within the scope of the appended claims form part of the present invention.

What is claimed is:

1. An improved automatically locking trailer lock, said lock comprising, in combination:
   (a) a lock body having two halves, including a generally inverted U-shaped upper half having a pair of depending spaced arms releasably disposed against a pair of upstanding arms of a generally U-shaped lower half, said two halves defining therebetween a central opening extending transversely therethrough and dimensioned to receive the generally central annular recessed portion of a trailer hitch post; and
   (b) an automatic locking mechanism disposed in said lock body, said mechanism comprising:
      i. a pair of posts secured in the arms of said upper half and depending therefrom into openings in the arms of said lower half, the lower portions of said posts bearing facing notches,
      ii. a generally transverse locking plate having opposite ends received in said notches to lock said posts and said upper half to said lower half,
      iii. a key lock component fixedly secured to said plate and extending to the lower end of said lower half, said key lock component being rotatable with a key to correspondingly rotate said plate to an unlocked position wherein said opposite plate ends are out of said notches, thereby permitting withdrawal of said upper half from said lower half; and
      iiii. biasing means biasing said plate into said locked position,
   (c) wherein said locking mechanism includes a return spring biasing said plate into said locked position and wherein the bottom ends of said posts are dimensional and tapered to temporarily move said plate ends into the unlocked position against said biasing spring force during insertion of said posts into said openings,
   (d) wherein said spring is generally V-shaped, wherein the lower ends of said depending arms have further depending peripheral rims and wherein the upper ends of said upstanding arms have recessed peripheries to receive said peripheral rims, whereby said halves have improved resistance against prying apart.

2. An improved anti-theft trailer assembly, said assembly comprising, in combination:
   (a) a trailer body;
   (b) a cab connector comprising a hitch post depending from the front portion of said trailer, said post having a generally central annular recess therein; and,
   (c) an improved lock releasably secured in said recess, said lock comprising, in combination:
      i. a lock body having two halves, including a generally inverted U-shaped upper half having a pair of depending spaced arms releasably disposed against a pair of upstanding arms of a generally U-shaped lower half, said two halves defining therebetween a central opening extending transversely therethrough and receiving said recessed portion of said trailer hitch post to fill the recess and slightly bulge therefrom; and
      (ii) an automatic locking mechanism disposed in said lock body, said mechanism comprising:
         (a) a pair of posts secured in the arms of said upper half and depending therefrom into openings in the arms of said lower half, the lower portions of said posts bearing facing notches,
         (b) a generally transverse locking plate having opposite ends thereof received in said notches to lock said posts and said upper half to said lower half,
         (c) a key lock component fixedly secured to said plate and extending to the lower end of said lower half, said key lock component being rotatable with a key to correspondingly rotate said plate to an unlocked position wherein said opposite plate ends are out of said notches, thereby permitting withdrawal of said upper half from said lower half; and (d) biasing means biasing said plate into said locked position.

(d) wherein said locking mechanism includes a return spring biasing said plate into said locked position and wherein the bottom ends of said posts are dimensioned and tapered to temporarily move said plate ends into the unlocked position against said biasing during insertion of said posts into said openings.

(e) wherein said spring is generally V-shaped, wherein the lower ends of said depending arms have further depending peripheral rims and wherein the upper ends of said upstanding arms have recessed peripheries to receive said peripheral rims, whereby said halves have improved resistance against prying apart.

* * * * *